US006975088B1

(12) United States Patent
Rehm et al.

(10) Patent No.: US 6,975,088 B1
(45) Date of Patent: Dec. 13, 2005

(54) AUTOMATIC DYNAMIC JOINT TENSIONING SYSTEM

(75) Inventors: Daniel J. Rehm, Greenwood, IN (US); John W. Kirk, Indianapolis, IN (US)

(73) Assignee: Automation by Design, Inc., Indianapolis, IN (US)

( * ) Notice: Subject to any disclaimer, the term of this patent is extended or adjusted under 35 U.S.C. 154(b) by 9 days.

(21) Appl. No.: 10/714,170

(22) Filed: Nov. 14, 2003

Related U.S. Application Data

(60) Provisional application No. 60/426,920, filed on Nov. 15, 2002.

(51) Int. Cl.[7] .............................................. G05D 15/00
(52) U.S. Cl. ..................... 318/638; 318/560; 29/524.1; 29/525.05; 29/525.06; 73/769
(58) Field of Search ................................ 318/638, 560; 29/524.1, 525.05, 526.06; 73/769

(56) References Cited

U.S. PATENT DOCUMENTS

| | | | | |
|---|---|---|---|---|
| 3,030,833 A | * | 4/1962 | Siegel et al. .................... | 227/61 |
| 3,773,238 A | * | 11/1973 | DeVoss ........................ | 227/61 |
| 4,174,801 A | * | 11/1979 | Holland et al. ................. | 227/4 |
| 4,620,656 A | * | 11/1986 | McClay et al. ................. | 227/5 |
| 5,375,754 A | * | 12/1994 | Botha et al. .................... | 227/58 |
| 5,440,813 A | | 8/1995 | Roskam ......................... | 30/254 |
| 5,461,765 A | | 10/1995 | Linden et al. .................. | 29/434 |
| 5,615,474 A | * | 4/1997 | Kellner et al. ................. | 29/703 |
| 5,687,463 A | * | 11/1997 | Michalewski et al. ..... | 29/243.53 |
| 5,694,694 A | | 12/1997 | Roskam ......................... | 30/254 |
| 5,855,054 A | | 1/1999 | Rivera et al. .............. | 29/525.06 |
| 6,041,493 A | * | 3/2000 | Donhauser ..................... | 29/715 |
| 6,161,273 A | | 12/2000 | Rivera et al. .............. | 29/525.06 |
| 6,415,515 B1 | | 7/2002 | Wheeler et al. ............... | 30/208 |
| 6,442,823 B1 | * | 9/2002 | Thompson .................. | 29/524.1 |
| 6,594,879 B2 | | 7/2003 | Wheeler et al. ............... | 29/434 |
| 6,763,568 B1 | * | 7/2004 | Mauermann et al. ....... | 29/432.2 |
| 6,796,020 B2 | * | 9/2004 | Thompson ..................... | 29/712 |
| 2001/0027597 A1 | * | 10/2001 | Mauer et al. ............. | 29/407.04 |

* cited by examiner

*Primary Examiner*—Rita Leykin
(74) *Attorney, Agent, or Firm*—William F. Bahret

(57) ABSTRACT

A system for automatically adjusting a fastener screw of a pivot joint between first and second parts of a pair of scissors, each part having a blade and a respective handle. A part clamp engages and holds the handle of the first part. A torque arm engages and moves the handle of the second part relative to the first part about the pivot joint. A driver adjusts the fastener screw to provide a desired resistance to relative movement between the first and second parts. A position encoder is connected to the part clamp and torque arm to generate a position signal indicative of the position of the second part relative to the first part. A torque transducer is connected to the parts clamp and torque arm to generate a torque signal indicative of the resistance to relative movement between the first and second parts. A controller has inputs operatively connected to the position encoder and to the torque transducer and an output operatively connected to the driver. The controller is responsive to the position signal and to the torque signal and controls the driver.

17 Claims, 7 Drawing Sheets

AUTOMATIC DYNAMIC JOINT TENSIONING SYSTEM

CROSS-REFERENCE TO RELATED APPLICATION

This application claims the benefit of U.S. Provisional Patent Application No. 60/426,920, filed Nov. 15, 2002, which application is hereby incorporated by reference.

BACKGROUND OF THE INVENTION

The present invention relates to automatic assembly systems and more particularly to systems for automatically fastening mating parts of an assembly having a dynamic joint.

Various attempts are shown in the prior art to deal with the problem of assembling a pair of mating parts having a pivot joint, such as a pair of scissors, with the desired tightness of the pivot joint.

U.S. Pat. No. 6,594,879 to Wheeler et al. is directed to setting the spacing between two or more moving, e.g., reciprocating, cutting elements of a power cutting tool. Wheeler teaches controlling the "clearance" between elements as they are fastened together.

U.S. Pat. No. 6,161,273 to Rivera et al. is directed to a method and apparatus for forming rivet joints that allow pivotal motion of the parts that are interconnected by such joints with a desired amount of clearance. Parts to be riveted together are aligned with each other and held in place on a parts support anvil, and a rivet is placed into aligned holes. A rivet support anvil is positioned against the head of the rivet to establish an initial condition. The rivet support is adjusted a required amount with respect to the parts support anvil prior to formation of the second head on the opposite end of the rivet. The rivet is allowed to move a controlled amount prior to formation of the second head, to provide the desired amount of clearance. The required amount of adjustment is determined empirically and is used thereafter in riveting a particular type of assembly, using fairly uniform parts and rivets of known composition. Once the correct amount of adjustment has been determined, the same adjustment relative to the initial condition will result in the desired clearance in each similar joint made thereafter.

U.S. Pat. No. 5,694,694 to Roskam is directed toward a pair of scissors having a screw holding the legs of the scissors together at the pivot joint to permit readjustment of the action by the user. A second screw provides for adjustment of the inclination of one blade relative to the other to adjust the tension and friction along the cutting edges.

U.S. Pat. No. 5,461,765 to Linden et al. is directed toward a method of manufacturing a pair of scissors wherein at least part of the pivot joint is molded of plastic material integrally with the plastic handle while the metal blades are held together. As a last step, the clearance at the joint is adjusted by applying a force sufficient to longitudinally displace the pivot joint to establish the desired amount of clearance, or by appropriately loosening the fastener prior to removing the assembly from the mold.

SUMMARY OF THE INVENTION

The present invention overcomes significant disadvantages of the prior art by providing, as one aspect thereof, a system that can adjust the pivot joint of an assembly dynamically, i.e., as the joint is "exercised," to provide that the desired resistance to movement is obtained at a predetermined point or points in the range of motion, or throughout the range of motion, as desired. As a result, the performance of the pivot is not highly dependent upon the manufacturing tolerances of the parts that comprise the assembly.

According to one aspect of the invention, a system is provided to automatically fasten mating parts of an assembly, measure the torque or tension between the mating parts as the parts are moved in relation to each other, and set the torque or tension by tightening or loosening the fastener to achieve the proper fit and function of a dynamic joint. Preferably, a predetermined torque or tension between the mating parts is set in at least one predetermined relative position, or configuration, of the mating parts.

According to another aspect of the invention, a system for automatically adjusting a fastener of a pivot joint between first and second parts of an assembly includes a first fixture configured to engage the first part and a second fixture configured to engage and move the second part relative to the first part about the pivot joint. A driver is configured to adjust the fastener to provide a desired resistance to relative movement between the first and second parts. A position encoder is connected to the first and second fixtures to generate a position signal indicative of the position of the second part relative to the first part. A torque transducer is connected to the first and second fixtures to generate a torque signal indicative of the resistance to relative movement between the first and second parts. A controller has inputs operatively connected to the position encoder and to the torque transducer and an output operatively connected to the driver. The controller is responsive to the position signal and to the torque signal, and the controller controls the driver.

According to yet another aspect of the present invention, a method for automatically adjusting a fastener of a pivot joint between first and second parts of an assembly is provided. The method includes the steps of moving the second part relative to the first part about the pivot joint while monitoring the relative angular displacement of the parts, driving the fastener while monitoring the torque required to move the second part relative to the first part, and adjusting the tightness of the fastener to achieve a monitored torque that is within predetermined limits.

Objects and advantages of the present invention will be more apparent upon reading the following detailed description in conjunction with the accompanying drawings.

DESCRIPTION OF PREFERRED EMBODIMENTS

Figure 1:
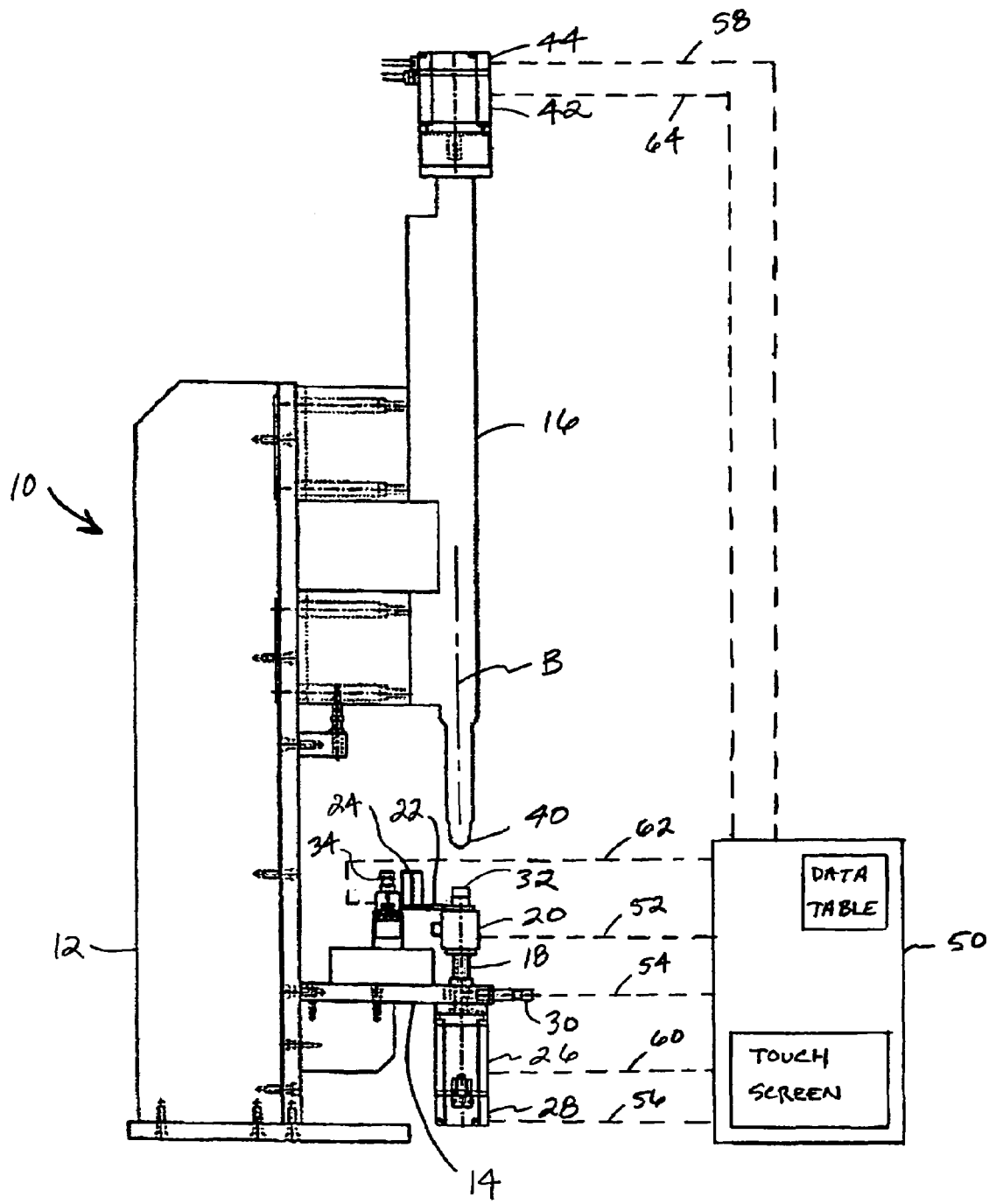
FIG. 1 is a side view of one embodiment of an automatic dynamic joint tensioning system according to the present invention.
Figure 2:
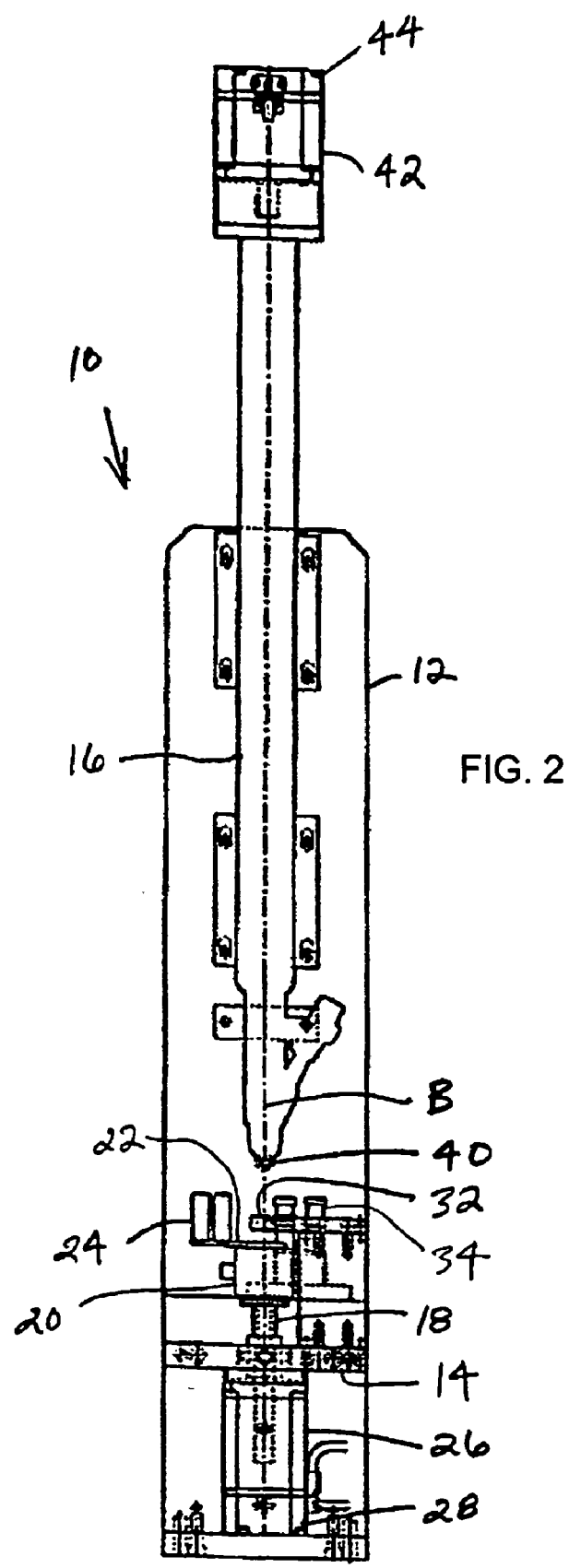
FIG. 2 is a front view of the system of FIG. 1.

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

One embodiment of a system according to the present invention is designed to fasten together the cutting blades of a pair of scissors and automatically tighten the fastener, e.g., a screw, to the proper level for desired scissors action, i.e., tight enough to begin cutting at the proper point but not so tight as to inhibit normal intended use.

Referring to FIGS. 1–4, there is illustrated a system 10 including a frame 12 supporting a table 14 and a fastening device 16 disposed above table 14. Fastening device 16 can be a model no. SA-36 screwdriver from Weber Screwdriving Systems, Mount Kisco, N.Y. Table 14 supports a vertical shaft 18 that is coaxial with a drive axis B. Attached to shaft 18, above table 14, is a torque transducer 20 and a torque arm 22 having fixture pins 24 proximate the free end thereof. Torque transducer 20 can be a model no. RTS-100 from Transducer Techniques, Temecula, Calif. Attached to shaft 18, below table 14, is a servo motor 26 and a position encoder 28. Servo motor 26 can be a model no. SGMAH-04AAF41 servo motor from Yaskawa Electric Corporation, Waukegan, Ill. A home switch 30 is connected to table 14 and shaft 18. Also supported by table 14 in cantilever fashion is a joint support 32 disposed above shaft 18, but not connected thereto, in alignment with drive axis B. A part clamp 34 is also supported by table 14. Part clamp 34 and fixture pins 24 are offset from drive axis B. Part clamp 34 can be a model no. RP-10 parallel gripper from Robohand, Inc., Monroe, Conn. Fastening device 16 includes a driver 40 mounted for rotation about drive axis B and driven by a drive servo motor 42 connected to a drive shaft (not shown). Drive servo motor 42 can be a model no. SGMPH-04AAE410 servo motor from Yaskawa Electric Corporation, Waukegan, Ill. Also connected to the drive shaft, and hence to driver 40, is a drive encoder 44.

A controller 50 has input signal line 52 connected to the output of torque transducer 20, input signal line 54 connected to the output of home switch 30, input signal line 56 connected to the output of position encoder 28, and input signal line 58 connected to the output of drive encoder 44. Controller 50 has output signal line 60 connected to the input of servo motor 26, output signal line 62 connected to the input of part clamp 34, and output control line 64 connected to the input of drive servo motor 42. Controller 50 may be a programmable logic controller (PLC), e.g., a PLC in the DL205 series from Automation Direct, Cumming, Ga. The PLC may be used with an Automation Direct EZTouch 8" STN color panel operator interface.

Figure 3:
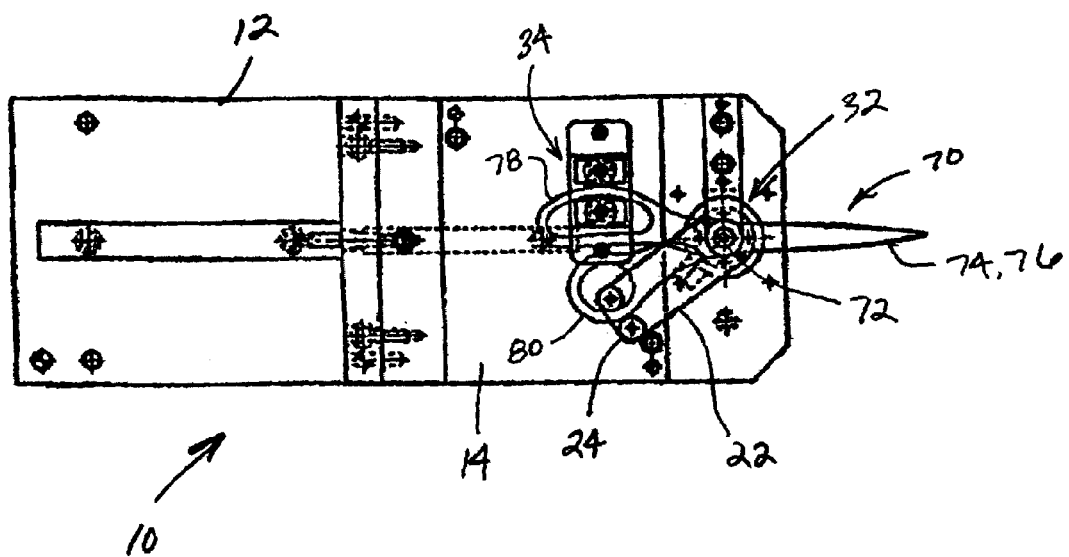
FIG. 3 is a top view of a portion of the system taken along line A—A of FIG. 1, and further showing an assembly mounted thereon in a first dynamic configuration.
Figure 4:
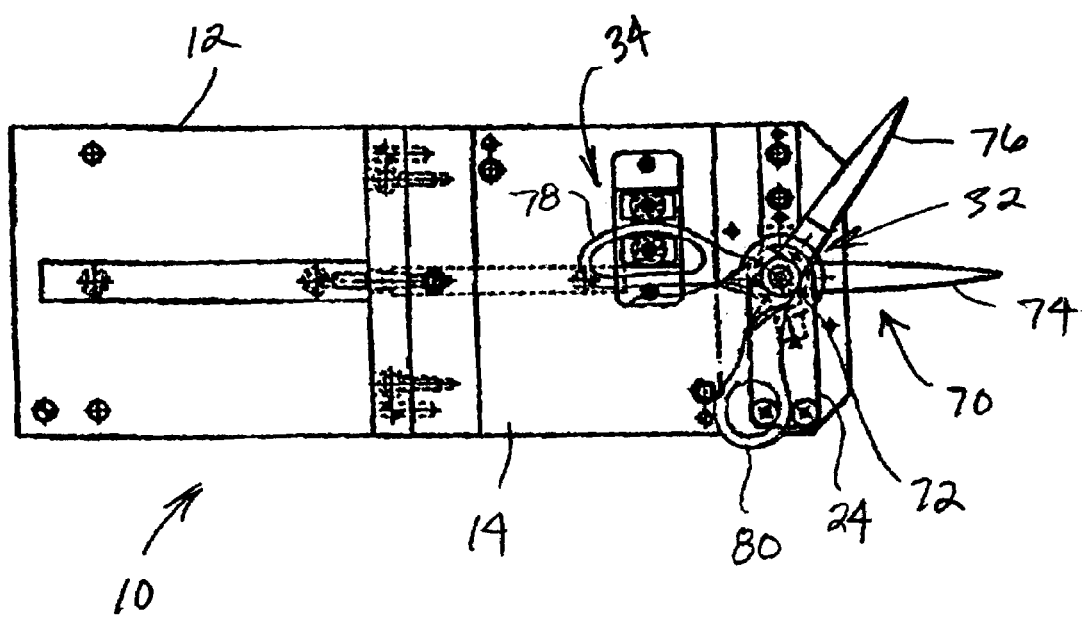
FIG. 4 is a top view of a portion of the system taken along line A—A of FIG. 1, and further showing the assembly mounted thereon in a second dynamic configuration.

Referring in particular to FIGS. 3 and 4, an assembly 70, such as a pair of scissors, having a fastener 72 that functions as a pivot dynamic joint, is shown in place on system 10. Preferably, the assembly 70, including fastener 72, would have been retrieved from another location, such as a carrying pallet on a conveyor, and placed on system 10 by a pick-and-place mechanism, not shown. In FIG. 3, assembly 70 is shown in a first configuration with the blades 74 and 76 closed and the respective handles 78 and 80 in a close relationship. In FIG. 4, assembly 70 is shown in a second configuration with the blades 74 and 76 separated and the respective handles 78 and 80 in a separated relationship. Blade 74 and handle 78 comprise a first part of assembly 70, and blade 76 and handle 80 comprise a second part of assembly 70. Assembly 70 is placed with pivot fastener 72, which can be a threaded screw, located on joint support 32 and aligned coaxially with drive axis B. Handle 78 is engaged by part clamp 34 and handle 80 is engaged by fixture pins 24 of torque arm 22. As torque arm 22 rotates about drive axis B, handle 80 and blade 76 are moved from the first configuration of FIG. 3 to the second configuration of FIG. 4, and vice versa.

Prior to system 10 automatically adjusting the fastener 72 to achieve the desired resistance to movement of the second part of assembly 70 relative to the first part of assembly 70, the operator has the capability of inputting via a touchscreen associated with controller 50 certain parameters such as driver backlash, offset angle, test angle, desired torque, torque tolerance, and number of attempts or tries. The input for driver backlash compensates for the backlash or "play" in the fastener driver, which allows for a more accurate result. The offset angle automatically positions the torque arm to accept a particular product configuration, and allows the system to adjust a range of product styles. The test angle, desired torque, and torque tolerance are variables which allow the system to qualify the torque at a specific point, and to accept the product only if the torque is within a specific range. The number of attempts is adjustable to allow for a predetermined number of tries to adjust the tension. If the proper tension is not met after a set number of tries, it is assumed that there is an inherent problem with the product that does not allow it to be tensioned properly. For example, there could be insufficient or excessive blade camber.

In operation, mating first and second parts of assembly 70 are retrieved from a pallet on a conveyor by a pick-and-place mechanism and placed into the system 10 with the joint fastener 72 positioned directly over the joint support 32. The home or starting position of the system is established with a home switch 30. The part clamp 34 rigidly holds the first part, or stationary member, of the assembly 70 in position. The second part, or dynamic member, of the assembly 70 is placed between the fixture pins 24 on the torque arm 22. Driver 40 of fastening device 16, which is powered by drive servo motor 42 and monitored by drive encoder 44 feeds and drives fastener 72 into the joint of the mating parts. The second dynamic member of the assembly 70 and the torque arm 22 are rotated or moved relative to the first stationary member of the assembly 70 by a servo motor 26. The relative position of the second dynamic member and the torque arm are monitored by an encoder 26 and stored in a data table associated with controller 50. The torque or tension between the mating parts is monitored by torque transducer 20 and stored in the data table.

Based upon feedback from the torque transducer 20, the fastening device 16 will automatically adjust the fastener via a PID loop to achieve the proper fit and function of the dynamic joint. A predetermined torque or tension of the joint will be set at a predetermined position of the mating parts in relation to each other. More specifically, the screw is tightened until the torque required to move the unrestrained blade relative to the restrained blade, as measured by torque transducer 20, is within predetermined limits, such as those shown in FIG. 5, at a predetermined angle, e.g., the angle which corresponds to the point during closing of the scissors where the ground edges of the two blades should meet to begin cutting. With the screw tightness set at that level, the tension between the blades is measured by torque transducer 20 through the range of operating angles of the scissors and any out-of-range measurement through the range of motion is indicated to a machine operator by means of an alarm, indicator light or the like so that appropriate action can be taken. As an example, the camber or other characteristic of one blade or the other may be out of tolerance such that the scissors tension, while correct at the point of initial contact between the cutting edges of the blades during closure thereof, is higher or lower than desired at some later point of scissors operation.

The torque and relative position of the joint are recorded and a torque curve is plotted to show the relationship between the torque and the relative position. The torque curve is plotted in real time to allow the operator to witness the resulting torque, not only at the critical position, but over the full stroke of the product. In this case, the desired torque is set at a predetermined point. However, it is desirable to witness the resulting torque over the full range of motion. For example, if there is a burr or "snag" in the cutting edge, it will cause a spike in the torque. By establishing a high and low torque tolerance, any product having such a spike can be distinguished as defective.

Figure 5:
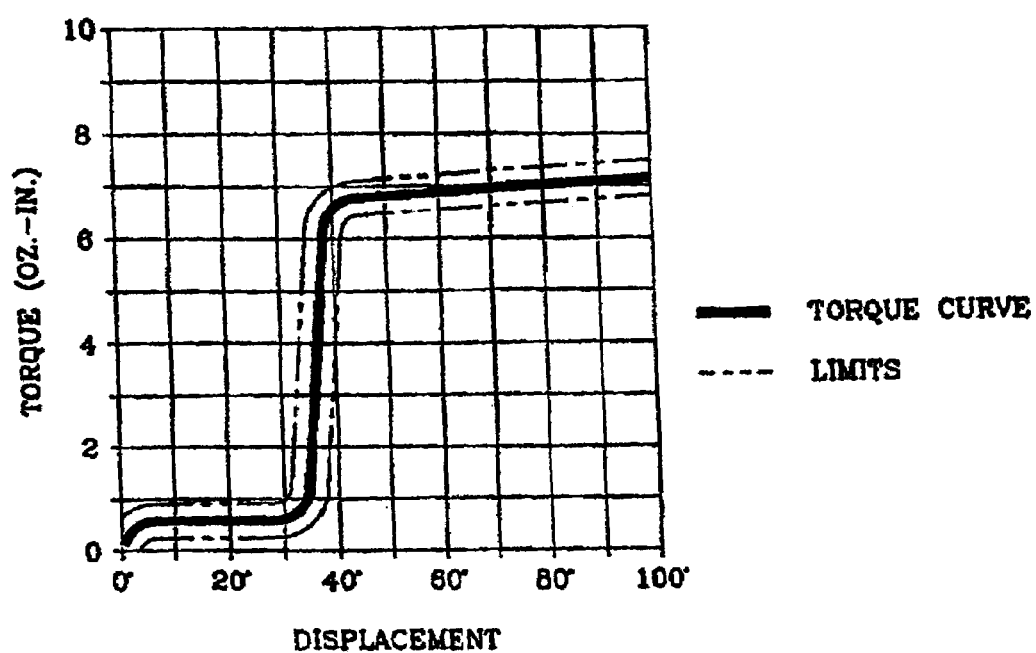
FIG. 5 is an example of a torque curve as used by an automatic dynamic joint tensioning system according to the present invention.

The scissors blades may be delivered to joint support 32 in a closed state, as shown in FIG. 3, by a pick-and-place mechanism, for example, from a moving conveyor line on which prior blade processing and pre-assembly steps have performed. The tension may be measured and compared to the full range of the above-referenced limits during an initial opening operation after initial insertion and tightening of a screw. Preferably, however, as a preliminary step, one blade is restrained by the grippers of part clamp 34, and the other blade is moved to a fully opened position in one continuous motion and then moved back to the closed position in order to properly defoil or debur the cutting edges of the blades. The scissors are then opened and closed again and, during such exercising operation, the tension is measured and compared at predetermined points to the above-referenced limits. It should be noted in this regard that FIG. 5 depicts torque with respect to relative displacement, i.e., angular displacement relative to an open state. Very little force is required to begin closing the scissors, but the force rapidly increases when the cutting edges of the blades come into contact with each other (as indicated at approximately 35° C. of relative displacement in FIG. 5.

Figure 6A:
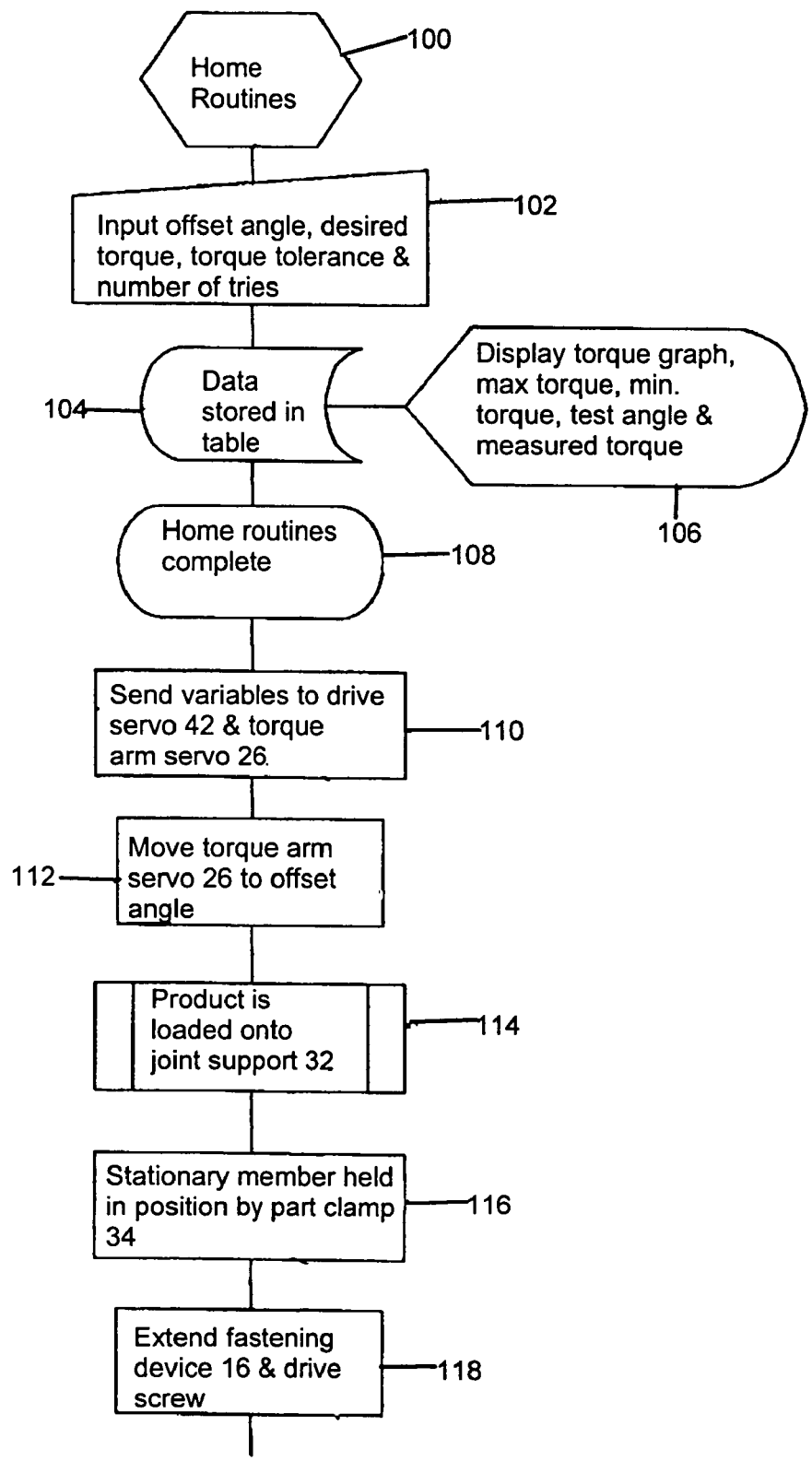
FIGS. 6A and 6B together comprise a flow chart illustrating the operational steps of the system of FIG. 1. The bottom of FIG. 6A is continued at the top of FIG. 6B.
Figure 6B:
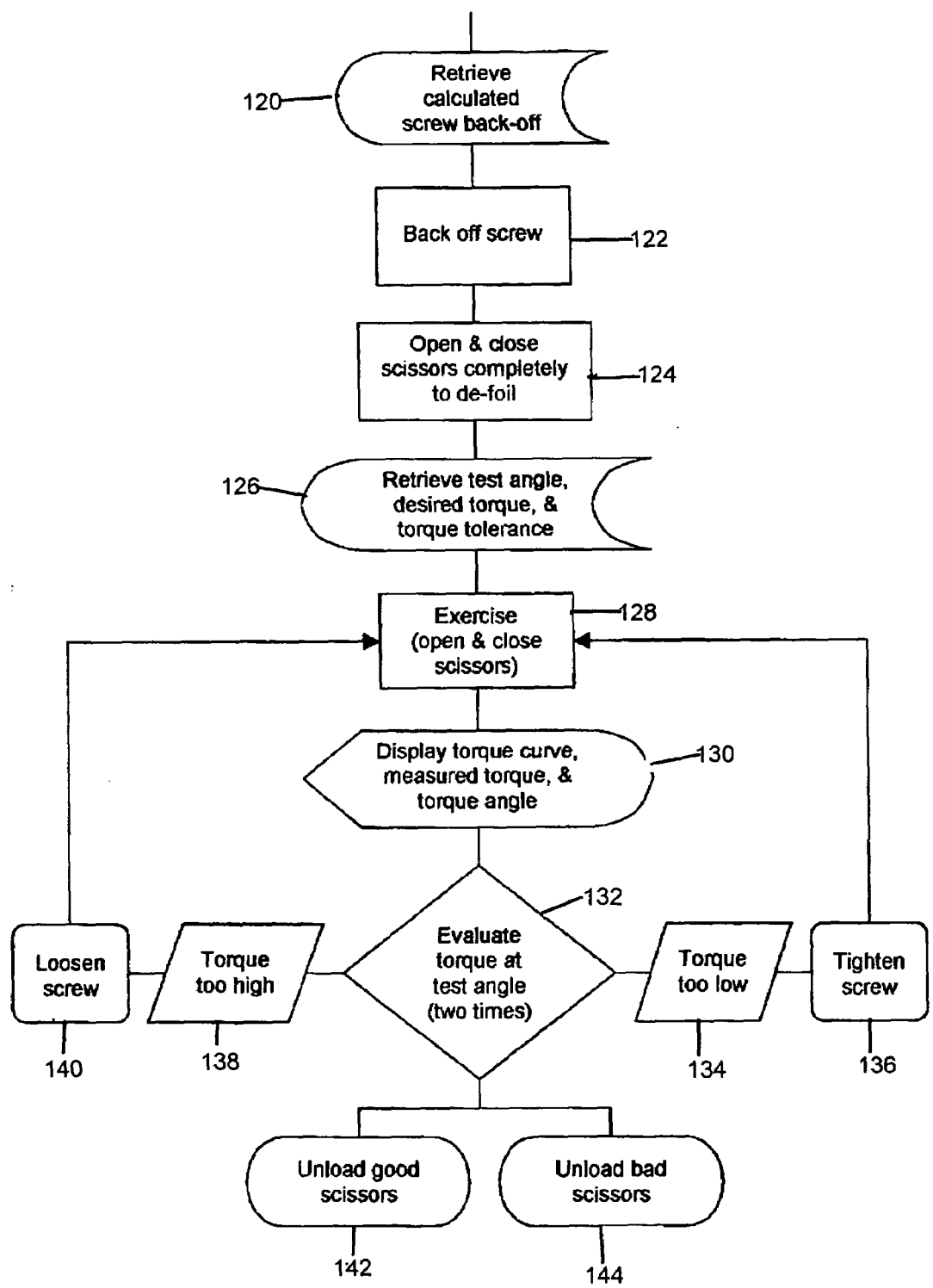

The operational steps of system 10 are summarized and illustrated in the flow chart of FIGS. 6A and 6B. Control of these steps is preferably implemented in ladder logic in controller 50. With reference to the flow chart of FIG. 6A, to which the parenthetical reference numerals that follow correspond, the operational steps of the system are as follows. The home routines are initiated (100) wherein the offset angle, desired torque, torque tolerance, and number of tries are inputted (102) and the data is stored in a table (104). A torque graph, maximum torque, minimum torque, test angle and measured torque are displayed (106) to complete the home routines (108). The controller sends the variables to drive servo 42 and torque arm servo 26 (110) such that the torque arm servo is moved to the offset angle (112) which may be zero, e.g., in cases where only one model of scissors is assembled and the home position is set accordingly, or may be some nonzero angle such as a desired offset angle for a particular model of scissors selected from a menu of models which the system is programmed to assemble. The assembly or scissors 70 is loaded onto joint support 32 (114), e.g., with a pick-and-place mechanism, and the first part or stationary member 78 of the assembly 70 is held in position by part clamp 34 (116). The fastening device 16 is extended and the screw fastener 72 is driven into the pivot joint of the assembly (118). The screw may be driven in until the driver stalls in response to the screw bottoming out in the joint, and then backed off a desired amount dependent upon the blade length and shape, e.g., blade camber.

Turning now to FIG. 6B, the controller retrieves a predetermined screw back-off value (120) and backs off the screw fastener (122). The assembly, or scissors, 70 is opened and closed completely to de-foil the blades (124). The controller retrieves the test angle, desired torque and torque tolerance (126) and exercises the assembly, or scissors, 70 by opening and closing the scissors (128). The torque curve, measured torque and torque angle are displayed for viewing by the operator (130). The torque is evaluated at the test angle (132). If the torque is too low (134), the screw fastener is tightened (136) and the steps (128, 130 and 132) are repeated. If the torque is too high (138), the screw fastener is loosened (140) and the steps (128, 130 and 132) are repeated. After the second evaluation of the torque at the test angle (132), if the torque is within the torque tolerance, the scissors assembly is noted as "good" and unloaded (142) by the pick-and-place mechanism to an unload conveyor. If the torque is not within the torque tolerance, the scissors assembly is noted as "bad" and is unloaded (144) by the pick-and-place mechanism to the unload conveyor. A diverter on the unload conveyor diverts the scissors assemblies that have been noted as "bad" to an alternate path to be scrapped or reprocessed. Alternatively, the pick-and-place mechanism could place "bad" assemblies directly in a scrap bin.

It will be appreciated from the foregoing description of the principles of the invention that the system may be suitable in a number of applications utilizing joined parts, e.g., slides, guides, bearings, and swivels for use in such products as automotive parts, electrical/electronic parts, appliances, medical devices, and consumer products.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

What is claimed is:

1. A system for automatically adjusting a fastener of a pivot joint between first and second parts of an assembly, comprising:

a first fixture configured to engage the first part;

a second fixture configured to engage and move the second part relative to the first part about the pivot joint;

a driver configured to adjust the fastener to provide a desired resistance to relative movement between the first and second parts;

a position encoder connected to the first and second fixtures to generate a position signal indicative of the position of the second part relative to the first part;

a torque transducer connected to the first and second fixtures to generate a torque signal indicative of the resistance to relative movement between the first and second parts;

a controller having inputs operatively connected to the position encoder and to the torque transducer and an output operatively connected to the driver, the controller being responsive to the position signal and to the torque signal, the controller controlling the driver.

2. The system of claim 1 and further including a drive encoder connected to the driver to generate a signal indicative of the angular rotation of the driver.

3. The system of claim 2 in which the controller has an input operatively connected to the drive encoder.

4. The system of claim 1 wherein the driver is driven by a drive servo motor.

5. The system of claim 4 wherein the controller has an output operatively connected to the drive servo motor.

6. The system of claim 1 wherein the second fixture is moved by a servo motor.

7. The system of claim 6 wherein the controller has an output operatively connected to the servo motor.

8. The system of claim 1 and further including a home position switch connected to the second fixture.

9. A system for automatically adjusting a fastener screw of a pivot joint between first and second parts of a pair of scissors, each part including a respective blade and handle, the system comprising:
- a first fixture configured to engage the handle of the first part of the pair of scissors;
- a second fixture configured to engage and move the handle of the second part of the pair of scissors relative to the first part about the pivot joint;
- a driver configured to adjust the fastener screw to provide a desired resistance to relative movement between the first and second parts;
- a position encoder connected to the first and second fixtures to generate a position signal indicative of the position of the second part relative to the first part;
- a torque transducer connected to the first and second fixtures to generate a torque signal indicative of the resistance to relative movement between the first and second parts;
- a controller having inputs operatively connected to the position encoder and to the torque transducer and an output operatively connected to the driver, the controller being responsive to the position signal and to the torque signal, the controller controlling the driver.

10. The system of claim 9, and further including a conveyor carrying the pair of scissors and a pick-and-place mechanism for retrieving the pair of scissors from the conveyor and placing them in the first and second fixtures.

11. A method for automatically adjusting a fastener of a pivot joint between first and second parts of an assembly, comprising the steps of:
- moving the second part relative to the first part about the pivot joint while monitoring the relative angular displacement of the parts;
- driving the fastener while monitoring the torque required to move the second part relative to the first part; and
- adjusting the tightness of the fastener to achieve a monitored torque that is within predetermined limits.

12. The method of claim 11, wherein the torque is monitored at a predetermined angular displacement.

13. The method of claim 12, wherein the monitored torque is compared to predetermined limits and if the torque is too low the fastener is tightened.

14. The method of claim 12, wherein the monitored torque is compared to predetermined limits and if the torque is too high the fastener is loosened.

15. A method for automatically adjusting a fastener screw of a pivot joint between first and second parts of a pair of scissors, comprising the steps of:
- moving the second part relative to the first part about the pivot joint while monitoring the relative angular displacement of the parts;
- driving the fastener screw while monitoring the torque required to move the second part relative to the first part; and
- adjusting the tightness of the fastener screw to achieve a monitored torque that is within predetermined limits.

16. The method of claim 15, and further including prior steps of:
- providing a pair of scissors in a first location; and
- retrieving the pair of scissors from the first location and placing them in another location.

17. The method of claim 16, wherein the first location is a conveyor.

* * * * *